Patented Oct. 25, 1949

2,485,928

UNITED STATES PATENT OFFICE 2,485,928

METHOD OF MAKING SILOXANES

Philip C. Servais, Midland, Mich., assignor to The Dow Chemical Company, Midland, Mich., a corporation of Delaware No Drawing. Application October 8, 1947, Serial No. 778,742

6 Claims. (Cl. 260—448.2)

The present invention is directed to the production of siloxanes from silanes.

The conventional method for the preparation of siloxanes involves the hydrolysis of silanes which contain hydrolyzable atoms or radicals, followed by the condensation of the hydrolyzate. This process has been used for many years, both in the work of Kipping and in the recent commercial production of siloxanes. When this method is employed in conjunction with hydrocarbonyl silicon chlorides, the by-product is hydrogen chloride, generally in dilute form. When hydrocarbonyl alkoxy silanes are employed the by-product is dilute alcohol. In each of these instances the value of the atom or radical which is removed by hydrolysis is lost as far as commercial utilization is concerned.

It is an object of this invention to provide methods for the conversion of silanes to siloxanes with the recovery of by-products in a commercially useful form.

Other objects and advantages will be apparent from the following description.

In accordance with the present invention a silane or a mixture of silanes is condensed. The silane or mixture of silanes has on the average from one to two monovalent alkyl or aryl radicals linked to the silicon. The remaining valences of the silicon atoms of the silane are satisfied by chlorine atoms and alkoxy radicals. Condensation is effected in liquid phase with $FeCl_3$ in admixture with the silane. In order to effect the condensation single silicon atoms have both chlorine and alkoxy linked thereto, and the total number of alkoxy radicals is at least as great as the number of chlorine atoms.

Silanes which are condensed in accordance with this invention are characterized by the general formulae $RSi(OR')_2Cl$ and $R_2SiOR'Cl$, in which R represents an alkyl or aryl radical and R' represents an alkyl group. These alkoxy and chloro substituted silanes, particularly

may be formed as by-products in the commercial manufacture of organo silicon compositions by the Grignard process in ether solution. Alternatively, they may be prepared by reacting a silane ester having the general formula $R_{4-m}Si(OR')_m$, wherein R represents a monovalent alkyl or aryl radical, R' represents an alkyl group and m is an integer equal to 1, 2, 3, or 4, with a polychloro silane having the general formula $R_{4-n}SiCl_n$, wherein R represents an alkyl or aryl radical and n is an integer equal to 2 or 3.

As a result of this reaction, one or more of the chlorine atoms on the polychloro silane is interchanged with a corresponding number of alkoxy radicals of the silane ester to form compounds having both chlorine and alkoxy substituents on the same silicon atom. Presence of a minor proportion of free acid aids in promoting the interchange reaction. It is to be noted that in some instances the entire product or products of the interchange reaction are compounds having the requisite number and ratio of alkoxy and chlorine substituents for condensation in accordance with the invention. Thus, when a diorgano dichloro silane is reacted with an equivalent amount of a diorgano dialkoxy silane, all the silanes produced may be condensed in accordance herewith.

An alcohol may be employed in lieu of the silane ester to provide alkoxy radicals for interchange with the chlorine atoms of the chloro silane. In this instance HCl, which is formed as a by-product, is preferably removed prior to the condensation step. In interchange reactions of the foregoing types, the R groups are inert.

In the condensation of silanes to siloxanes in accordance with the present invention, a chlorine atom combines with the hydrocarbon portion of an alkoxy radical to form an alkyl chloride. Because of the relatively low boiling points of the alkyl chlorides, they are readily separated in substantially pure form from the siloxane residue. If a silane ester and a polychloro silane are mixed in the presence of $FeCl_3$, condensation occurs during or upon completion of the interchange.

The rate of reaction is dependent to some extent upon the proportion of $FeCl_3$ in the mixture. I prefer to employ at least 0.03% by weight of $FeCl_3$ to bring about condensation at a commercially satisfactory rate. By increasing the amount of $FeCl_3$, condensation can be accomplished more rapidly, resulting in an increase in the viscosity of the siloxane product. As large a quantity of catalyst may be employed as desired, although it is generally preferable to employ less than 3% by weight, as the use of larger amounts may cause the reaction to proceed at a faster rate than can be managed with facility. The amount of catalyst employed is relatively independent of the particular compound or mixture of compounds involved. Presence of a small amount of HCl will serve to promote catalysis. $FeCl_3$ appears to be the only suitable catalyst for the condensation, as other metallic chlorides do not give the desired results.

The present condensation is effected at a temperature above 50° C. and below the temperature at which destructive distillation of the siloxane would occur. The reaction is generally complete at temperatures below 200° C., which temperatures are preferred.

When an alkoxy silane or an alcohol and a chloro silane are admixed prior to condensation, there is generally sufficient heat generated by the interchange reaction between the alkoxy radical and the chlorine atom to bring about condensation at the desired rate if $FeCl_3$ is present. However, in other instances, particularly when an alkoxy chloro silane is the starting material, the silane is heated to the temperature range indicated. Control of the condensation reaction is readily accomplished by allowing the heat of reaction to cause boiling and by refluxing the materials so boiled. This provides for the removal of the heat of reaction. As is known, the specific temperature to which the refluxing reaction mixture is held may be controlled by adjusting the pressure on the reaction mixture. With adequate indirect temperature control, the reaction mixture may be maintained at any desired temperature below that at which refluxing occurs.

The properties of the siloxane products are influenced considerably by the amount of catalyst present, the temperature at which the reaction is carried out and the length of time the mixture is heated. A relatively low temperature and small proportion of catalyst generally results in the formation of low viscosity siloxane liquids. By increasing the proportion of catalyst and/or employing higher temperatures, with consequent increase in the rate of reaction, higher viscosity liquids are obtained.

I have found that the presence of a suitable organic solvent, such as toluene, inhibits rapid reaction. For this reason, it may be advantageous to dilute the alkoxy chloro silane with solvent when low viscosity siloxanes are desired as the product. The proportion of solvent to silane is not critical, although I have found that equal parts by volume of solvent and silane effects this result. Preferably the solvent is present in the mixture before the catalyst is added.

Separation of by-product alkyl chloride may be accomplished through distillation as the condensation proceeds. When evolution thereof ceases the reaction is complete.

An outstanding feature of this invention lies in the formation of substantially pure alkyl chloride as a by-product, which is of commercial importance because it can be recycled for reaction directly with silicon or it may be reacted with $SiCl_4$ by the Grignard method. If desired, it can be stored either as gas or liquid for future use. This is in contrast with the present commercial practice wherein by-products are discarded.

The siloxane condensation products obtained by practicing this invention range from low viscosity, water white liquids to high viscosity fluids having substantially no flow at room temperature. They are characterized by both linear and cyclic structures, which contain alternate silicon and oxygen atoms and there are generally one or two hydrocarbonyl groups attached to the silicon atom. Any excess alkoxy radicals not removed in the condensation are present in the siloxane produced and are linked to silicon atoms therein. These alkoxy radicals may be hydrolyzed, if desired.

A better understanding of the invention may be had by reference to the following examples, which are not to be construed as limiting the scope thereof.

*Example 1*

Equal mol ratios of $CH_3Si(OC_2H_5)_3$ and $CH_3SiCl_3$ were combined and 1% $FeCl_3$ by weight was added to the mixture. On heating the mixture, $C_2H_5Cl$ evolution began at 75° C. pot temperature and a substantially theoretical yield thereof was obtained. The balance of the mixture was converted to methyl siloxane.

*Example 2*

1.5% by weight $FeCl_3$ was added to liquid $(CH_3)_2SiOC_2H_5Cl$, and the mixture was heated to 75° C. pot temperature. At this temperature $C_2H_5Cl$ evolution began and a substantially theoretical yield thereof was obtained. The residual product was liquid polymeric dimethyl siloxane.

*Example 3*

One mol of $CH_3OH$ was added to one mol of $(CH_3)_2SiCl_2$. An exchange reaction took place, whereby there was formed $(CH_3)_2SiOCH_3Cl$ and $HCl$, the latter being removed by distillation. 1% by weight $FeCl_3$ was then added to the $(CH_3)_2SiOCH_3Cl$ and the mixture was heated to 80° C. pot temperature. Reaction was rapid at this temperature and a theoretical yield of $CH_3Cl$ was obtained. There was obtained also liquid polymeric dimethyl siloxane, having the formula $[(CH_3)_2SiO]_n$ in substantially theoretical amount.

*Example 4*

A mixture of equal mol ratios of $C_6H_5SiCl_3$, $C_6H_5CH_3SiCl_2$, and $CH_3SiCl_3$ was treated with anhydrous $C_2H_5OH$ in amount equivalent to one half the total chloride content of the silane mixture to provide ethoxy radicals for interchange with the Cl atoms. After removal of excess HCl by-product of the interchange, the residual mixture was cooled, 0.5% by weight $FeCl_3$ was added and the mixture was reheated. Reaction became vigorous when the pot temperature reached 90° C., and the temperature quickly rose to 140° C. $C_2H_5Cl$ was evolved rapidly and was collected. The balance of the mixture was a high molecular weight siloxane polymer.

*Example 5*

Example 4 was repeated, except that the mixture was diluted with an equal volume of toluene before addition of catalyst. Presence of toluene slowed the evolution of ethyl chloride. A liquid polymer was obtained of lower molecular weight than in Example 4 in addition to the ethyl chloride by-product.

*Example 6*

Equimolar ratios of $(CH_3)_2SiCl_2$ and $(CH_3)_2Si(OC_2H_5)_2$ were combined and 0.1% $FeCl_3$ was added to the mixture. $C_2H_5Cl$ evolution was slow at a pot temperature of 90° C. The mixture was then cooled and saturated with HCl to promote the interchange of chlorine and ethoxyl. Heating was then resumed and evolution of $C_2H_5Cl$ was approximately double that previously observed.

Nearly the theoretical quantity of $C_2H_5Cl$ was obtained. The residual product was polymeric dimethyl siloxane in liquid form.

Example 7

2.5 mols (80.2 g.) of $C_2H_5OH$ was added to 1.5 mols (276.6 g.) of a mixture of equal mol ratios of $C_6H_5CH_3SiCl_2$, $C_6H_5SiCl_3$, and $CH_3SiCl_3$. 0.03% $FeCl_3$ by weight was then added and the mixture was heated. Between 105°–110° C. pot temperature, evolution of $C_2H_5Cl$ was so rapid that the flask had to be cooled occasionally to control the rate of reaction. A theoretical yield of $C_2H_5Cl$ was obtained, while the yield of liquid polymeric phenyl methyl siloxane residue was 92.5% of theoretical.

Example 8

One mol of $C_6H_5SiCl_3$ was combined with two mols of $C_2H_5OH$. An interchange reaction occurred with the formation of $C_6H_5Si(OC_2H_5)_2Cl$ and HCl, the latter being removed by fractional distillation. 0.5 per cent by weight $FeCl_3$ was added to the $C_6H_5Si(OC_2H_5)_2Cl$, which was then heated. $C_2H_5Cl$ was evolved at a pot temperature of 100° C. and 77.5 per cent of theoretical $C_2H_5Cl$ was recovered. The residual material was a siloxane polymer in liquid form.

Example 9

.45 mol of $CH_3Si(OC_2H_5)_3$ and .55 mol of $C_6H_5CH_3SiCl_2$ were combined and 0.1 per cent by weight $FeCl_3$ was added. The mixture was heated and $C_2H_5Cl$ was evolved at 90° C. pot temperature. 92 per cent of theoretical $C_2H_5Cl$ was obtained as distillate. The condensation product was a low viscosity liquid siloxane copolymer.

Example 10

.50 mol of $CH_3Si(OC_2H_5)_3$, .25 mol of $(C_6H_5)_2SiCl_2$ and .25 mol of $C_6H_5CH_3SiCl_2$ were combined and 0.1 per cent by weight $FeCl_3$ was added. The mixture was heated to 90°–100° C. pot temperature. On completion of the reaction 77 per cent of theoretical ethyl chloride was obtained, the balance of the mixture being converted to the phenyl methyl siloxane copolymer.

Example 11

.05 per cent by weight $FeCl_3$ was added to $C_6H_5Si(OC_2H_5)_2Cl$ and the mixture was heated. 77.5 per cent of the theoretical yield of ethyl chloride was recovered, the pot temperature being maintained below 120° C. The residual siloxane was a polymer containing phenyl and ethoxy substituents on the silicon atom.

Example 12

Isopropyl alcohol was cooled to about 10° C. and an equal mol ratio of $(CH_3)_2SiCl_2$ was added slowly thereto so that the temperature was maintained below 15° C. Following addition of the $(CH_3)_2SiCl_2$ the mixture was warmed to 108° C. and an interchange reaction took place with formation of $(CH_3)_2SiOC_3H_7Cl$ and HCl, the latter being removed by distillation. The residual $(CH_3)_2SiOC_3H_7Cl$ was cooled and 0.1% $FeCl_3$ by weight was added. Heating was resumed and the vapor evolved below a pot temperature of 150° C. was collected. The evolved vapor was condensed and found to be substantially pure isopropyl chloride. Nearly the theoretical quantity of $[(CH_3)_2SiO]_n$ was obtained as residue in the form of a low viscosity liquid.

Example 13

$(CH_3)_2SiCl_2$ was added slowly to butyl alcohol until equal mol ratios of the reactants were combined, the temperature being maintained below 10° C. After completion of the addition the mixture was warmed to distill off the HCl which was formed. The residual $(CH_3)_2SiOC_4H_9Cl$ was then cooled and 0.1% by weight $FeCl_3$ was added, followed by refluxing for 8 hours. A yield of approximately 55% of theoretical butyl chloride was obtained. Liquid $[(CH_3)_2SiO]_n$ was obtained as residue.

Example 14

Equal mol ratios of stearyl methyl dichloro silane and ethyl alcohol were combined while the temperature was maintained below 10° C. The mixture was heated and HCl was driven off. After cooling, 0.1% by weight $FeCl_3$ was added and the temperature was raised to 235° C., the reflux temperature of the mixture. Conversion of the mixture to ethyl chloride and low viscosity stearyl methyl siloxane polymer was complete after 8 hours heating at this temperature.

Having fully described my invention, what I claim is:

1. The method of condensing monosilanes of the general formula $R_{4-n}SiX_n$, wherein R represents a radical of the group consisting of alkyl and monocyclic aryl radicals, X represents a radical of the group consisting of chlorine atoms and alkoxy radicals, and $n$ has a value from 2 to 3 inclusive, said silanes being condensed containing both chlorine atoms and alkoxy radicals bonded to the same silicon atoms, and the number of alkoxy radicals in the silanes being condensed being at least as great as the number of chlorine atoms, which comprises contacting said silanes in liquid phase with $FeCl_3$ at a temperature above 50° C. and below the temperature at which destructive distillation of the siloxane would occur, whereby condensation thereof to a siloxane is accomplished with the formation of alkyl chloride.

2. The method of producing organosiloxanes which comprises maintaining a mixture of a chlorosilane of the general formula $R_{4-n}SiCl_n$ where R is a radical of the group consisting of alkyl and monocyclic aryl radicals and $n$ has a value from 2 to 3 inclusive and an alkoxy silane of the general formula $R_{4-m}Si(OR')_m$ where R is a radical of the group consisting of alkyl and monocyclic aryl radicals, R' is an alkyl radical, and $m$ has a value from 1 to 4 inclusive, in liquid phase in contact with $FeCl_3$ at a temperature above 50° C. and below the temperature at which destructive distillation of the siloxane would occur, whereby a siloxane and an alkyl chloride are produced.

3. The method of producing organosiloxanes which comprises maintaining a mixture of a chlorosilane of the general formula $R_2SiCl_2$ where R is a radical of the group consisting of alkyl and monocyclic aryl radicals, and an alkoxy silane of the general formula $R_2Si(OR')_2$ where R is a radical of the group consisting of alkyl and monocyclic aryl radicals and R' is an alkyl radical, in liquid phase in contact with $FeCl_3$ at a temperature above 50° C. and below the temperature at which destructive distillation of the siloxane would occur, whereby a siloxane and an alkyl chloride are produced.

4. The method of producing organosiloxanes which comprises maintaining a mixture of a chlorosilane of the general formula $R_{4-n}SiCl_n$ where R represents a radical of the group consisting of alkyl and monocyclic aryl radicals and $n$ has a value from 2 to 3 inclusive, and an alcohol of the general formula R'OH where R' represents an alkyl radical, in liquid phase in contact with $FeCl_3$ at a temperature above 50° C. and below the temperature at which destructive distillation of the siloxane would occur, whereby a siloxane and an alkyl chloride are produced.

5. The method of producing siloxane from a substituted silane having the general formula $R_2SiOR'Cl$, wherein R represents a radical of the group consisting of alkyl and monocyclic aryl radicals and R' represents an alkyl radical, which comprises maintaining said silane in liquid phase in contact with $FeCl_3$ at a temperature above 50° C. and below the temperature at which destructive distillation of the siloxane would occur, whereby condensation is effected to siloxane with the formation of alkyl chloride.

6. The method of making polymeric dimethyl siloxane from $(CH_3)_2SiOCH_3Cl$, which comprises contacting said silane in liquid phase with a minor proportion of $FeCl_3$ at a temperature above 50° C. and below the temperature at which destructive distillation of the siloxane would occur, whereby condensation is accomplished with the formation of dimethyl siloxane and methyl chloride, and separating the products of the reaction.

PHILIP C. SERVAIS.

REFERENCES CITED

The following references are of record in the file of this patent:

UNITED STATES PATENTS

| Number | Name | Date |
| --- | --- | --- |
| 2,377,689 | Hyde | June 5, 1945 |
| 2,389,477 | Wright | Nov. 20, 1945 |
| 2,405,988 | Barry | Aug. 20, 1946 |
| 2,421,653 | Sauer | June 3, 1947 |

OTHER REFERENCES

Friedel et al., "Berichte der Deut. Chem. Gesell.," vol. 3 (1868–70), pages 15–19.